April 19, 1932.    M. L. DODGE ET AL    1,854,398

SOLE MOLDING MECHANISM

Original Filed Aug. 23, 1928

Inventors:
Milton L. Dodge,
Hugh A. Jordan.
by Wright Brown Quinby May
Attys.

Patented Apr. 19, 1932

1,854,398

UNITED STATES PATENT OFFICE

MILTON L. DODGE AND HUGH A. JORDAN, OF NEWBURYPORT, MASSACHUSETTS; SAID JORDAN ASSIGNOR TO SAID DODGE

SOLE MOLDING MECHANISM

Original application filed August 23, 1928, Serial No. 301,628. Divided and this application filed October 10, 1929. Serial No. 398,654.

This invention relates to mechanism for molding the soles of shoes, more particularly while on the last and while not restricted to such use, the mechanism has been more especially designed to mold the soles of turn shoes after they have been relasted and as part of a process of manufacture more particularly described and claimed in our application for patent Serial No. 301,628, filed August 23, 1928, for method and apparatus for making shoes, and of which this application is a division.

The mechanism of the present invention molds the shank portion of the sole with an initial wiping action and can mold shoes of a wide variety of shapes and sizes with the same molding form.

For a more complete understanding of this invention, reference may be had to the accompanying drawings in which Figures 1 and 2 are a side elevation and an inverted plan, respectively, of a molding form.

Figure 1:
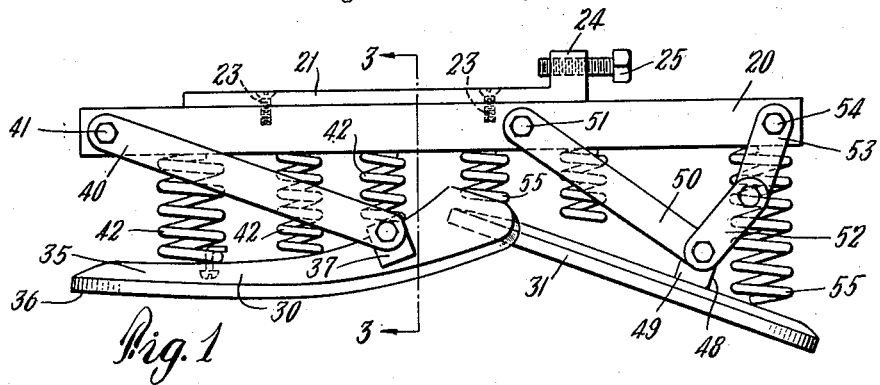
Figure 2:
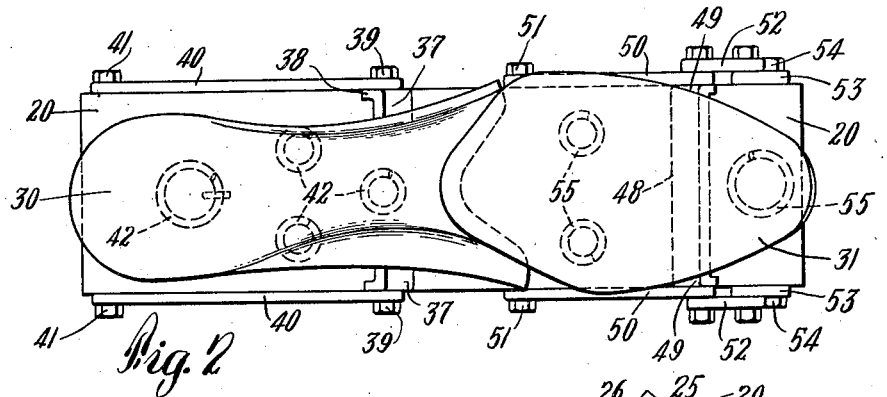
Figure 3:
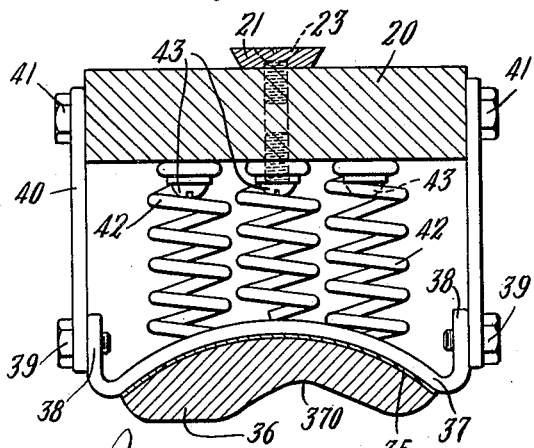
Figure 3 is a section to a larger scale on line 3—3 of Figure 1.

Referring to Figures 1, 2 and 3, it will be seen that the form comprises a support 20 which is provided on its upper face with any suitable means by which it may be fixed to a platen of a molding machine. As shown for this purpose there is provided a dovetail bar 21 fixed to the support 20 by any suitable means such as screws 23. One end of this bar is shown as provided with an upstanding lug 24 through which is threaded an adjusting abutment screw 25. When this form is applied to the molding machine shown in Figure 4, the bar fits in a mating groove in the platen 27 and this abutment screw 25 engages a shoulder portion 26 on the platen and limits the rearward and downward motion of the form relative thereto. As shown the form carries a pair of molding elements as 30 and 31. The molding element 30 is shaped to mold the shank portion of the shoe and may be used alone if desired, although it is usually preferable to mold the forepart by the same molding operation, in which case the element 31 will be used. Each of these elements 30 and 31, or more especially the element 30 comprises a plate of resilient material such as spring steel as shown best at 35 in Figure 3, this plate being overlaid with a suitable cushion, such as 36, of sole leather or the like, shaped more accurately to the contour of that portion of the shoe which is to be engaged by the element. In the shank form this cushion 36 is shown as having a central re-entrant portion 370 which is preferably somewhat more acute than the corresponding portion of the shank in order that molding pressure may be exerted more particularly on the side margins of the shank to force them down to the wood of the last.

The element 30 is carried by the support 20 by means which permit it to have a limited motion toward and from this support. For this purpose a strap 37 is shown as fixed to the rear or top face of the plate 35, its ends being upwardly turned as at 38 to receive screws 39 which form pivots for the lower ends of a pair of links 40, the upper ends of which are hinged at 41 to one end portion of the support 20. Interposed between the element 30 and the support 20 are springs 42 which preferably have their upper ends fixed to the lower face of the support as by screws 43. The element 30 is thus permitted a resilient motion toward and from the support 20 being guided in this motion by the links 40. It will be noted that this form is concave on its under face, the concavity being particularly pronounced toward its forward end and within the concavity rides the rearward end of the forepart molding element 31. This element is provided toward its forward end with a transverse strap 48 having upturned ends 49 to which are pivoted links 50 pivoted at their opposite ends to the side of the support 20, as at 51. The upturned ends 49 are also connected through pivoted links 52 and 53 with the forward portion of the support 20, as at 54. Interposed between the element 31 and the support 20 are the coil springs 55 which are preferably fixed to the under side of the support 20 as by screws in the manner previously described for the springs 42.

The forming plates, particularly the shank forming plate 30, being of spring material yield when forced under pressure against the outside face of the sole, exerting their pressure very strongly against the marginal portions of the shank so as to seat them firmly to the last, and, being of resilient or spring material, this pad is enabled to conform under heavy pressure to the contour of the last so that the same form can be used for a considerable range of sizes and shapes of lasts. Moreover, as the elements are brought down onto the shoe, this shank form exerts a downwardly and rearwardly directed wiping action on the shank until it is firmly seated in pressure contact therewith, this initial wiping action serving to smooth down the sides of the shank portion of the sole and acts to help in forming the sole to the last contour. Since the forepart is substantially flat the same wiping action is of less importance at this portion of the shoe, although it takes place to some extent.

Figure 4:
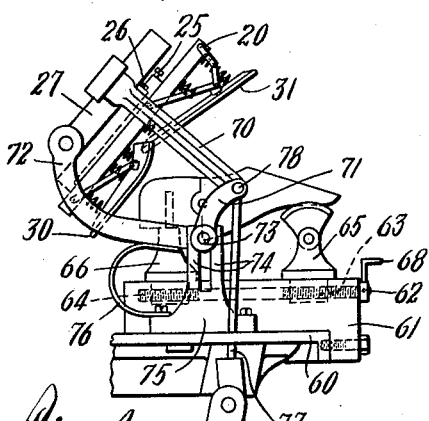
Figure 4 is a fragmentary side elevation of a molding machine using the form shown in Figures 1, 2 and 3.

In order that the form may be held in molding contact with the shoe for a substantial period, some type of machine which will permit this without substantial slowing down the rate of progress of the shoes through the factory is of importance, and such a machine is shown in our Patent No. 1,709,842, granted April 23, 1929. A portion of the top of this machine, as slightly modified for the purpose of this molding operation, is shown in Figure 4. Referring to this figure, it will be seen that on the machine bed 60 is fixed a block 61 within which is journaled a rod 62 having opposite end portions 63 and 64 threaded oppositely. The threaded portion 63 is in threaded engagement with a toe support 65 of any suitable description and the rear threaded portion 64 is in similar engagement with a last pin supporting post 66. These supports for the shoe may be adjusted from and toward each other by turning the shaft 62 as by means of the handle 68. The molding form is fixed to the platen 27 as hereinbefore suggested and this platen has fixed thereto on opposite sides an actuating bar 70. This bar 70 is fixed to an arm 71 to which is also fixed an arm 72, which is connected to the rear portion of the platen 27. The arm 72 and the link 71 are fixed to a shaft 73 which is vertically slidable between jaws 74 of a bracket 75 made fast to the machine frame. Normally this shaft 73 is held at the upper portion of the bracket 70 as by means of the leaf spring 76. An actuating rod 77 is fixed at its upper end, as at 78, to the actuating bar 70 and the link 71, and when it is depressed, its first action is to turn the bar 70, link 71, arm 72 and the platen 27 to a position directly over the shoe supported on the posts 65 and 66, whereupon further downward pressure exerted thereon brings the shaft 73 downwardly and applies the sole engaging elements 30 and 31 directly to the sole of the shoe. In accordance with the showing of our joint patent hereinbefore identified the work table 60 may then be swung around while the shoe is held under sole molding pressure and while others are being inserted or removed, and the sole molding pressure is then released so that a shoe which is molded may be taken out from the machine and a shoe to be molded inserted therein, while other shoes are held under molding pressure. It is found that by exerting the molding pressure in this manner, no hand pounding out of the sole is necessary during the entire manufacture of the shoe and that a very much better molded contour can be produced than by the hand method of pounding out or by machines which exert a pounding action in shaping the sole.

From the foregoing description of an embodiment of this invention, it should be evident to those skilled in the art that various changes and modifications might be made without departing from the spirit or scope of this invention as defined by the appended claims.

We claim:

1. A sole molding form comprising a support, a sole engaging element, springs interposed between said support and element, and link connections between said support and element for controlling the direction of relative movement thereof.

2. A sole molding form comprising a support, a sole engaging element comprising spring sheet material, link connections between said support and element for controlling the direction of relative movement thereof, and springs interposed between said support and element.

3. A sole molding form comprising a support, a shank engaging element having a concave forward portion, a forepart engaging element having its rear end shaped to engage in said concave forward portion, and means for resiliently supporting said elements independently from said support.

In testimony whereof we have affixed our signatures.

MILTON L. DODGE.
HUGH A. JORDAN.